United States Patent
Yamashina

(10) Patent No.: US 10,203,406 B2
(45) Date of Patent: Feb. 12, 2019

(54) FMCW RADAR DEVICE AND FMCW RADAR SIGNAL PROCESSING METHOD

(71) Applicant: Mitsubishi Electric Corporation, Tokyo (JP)

(72) Inventor: Noriyoshi Yamashina, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 667 days.

(21) Appl. No.: 14/710,004

(22) Filed: May 12, 2015

(65) Prior Publication Data
US 2016/0139257 A1    May 19, 2016

(30) Foreign Application Priority Data

Nov. 19, 2014  (JP) ................................. 2014-234110

(51) Int. Cl.
*G01S 13/58* (2006.01)
*G01S 7/35* (2006.01)
(Continued)

(52) U.S. Cl.
CPC .............. *G01S 13/584* (2013.01); *G01S 7/35* (2013.01); *G01S 7/354* (2013.01); *G01S 13/345* (2013.01);
(Continued)

(58) Field of Classification Search
CPC ...... G01S 13/584; G01S 7/354; G01S 13/345; G01S 7/35; G01S 7/03; G01S 13/931; G01S 13/726; G01S 2007/356
(Continued)

(56) References Cited

U.S. PATENT DOCUMENTS

| | | | | |
|---|---|---|---|---|
| 2003/0052813 A1* | 3/2003 | Natsume | ................. | G01S 7/354 342/70 |
| 2006/0214839 A1* | 9/2006 | Mitsumoto | ........... | G01S 5/0226 342/70 |

FOREIGN PATENT DOCUMENTS

| | | | |
|---|---|---|---|
| JP | 2011232053 A | * | 11/2011 |
| JP | 2011232053 A | | 11/2011 |
| JP | 2013-088273 A | | 5/2013 |

OTHER PUBLICATIONS

Communication dated Dec. 8, 2015, from the Japanese Patent Office in corresponding application No. 2014-234110.

* cited by examiner

*Primary Examiner* — Peter M Bythrow
*Assistant Examiner* — Helena H Seraydaryan
(74) *Attorney, Agent, or Firm* — Sughrue Mion, PLLC; Richard C. Turner

(57) ABSTRACT

The FMCW radar device includes: a range observation period setting section configured to set a plurality of range observation periods; a modulated frequency width setting section configured to set, for the respective plurality of range observation periods, a plurality of modulated frequency widths; a beat signal generation section configured to generate, for the respective plurality of range observation periods, beat signals based on the transmission signal and the reception signal; and a pass bandwidth setting section configured to set pass bandwidths of the beat signals generated by the beat signal generation section, in which the modulated frequency width setting section sets, for the respective plurality of range observation periods, the plurality of modulated frequency widths so that a difference among maximum frequencies of the beat signals generated for the respective plurality of range observation periods becomes zero or falls within a predetermined range.

5 Claims, 4 Drawing Sheets

(51) Int. Cl.
*G01S 13/34* (2006.01)
*G01S 7/03* (2006.01)
*G01S 13/72* (2006.01)
*G01S 13/93* (2006.01)

(52) U.S. Cl.
CPC .............. *G01S 7/03* (2013.01); *G01S 13/726* (2013.01); *G01S 13/931* (2013.01); *G01S 2007/356* (2013.01)

(58) Field of Classification Search
USPC .................................................. 342/109, 70
See application file for complete search history.

FMCW RADAR DEVICE AND FMCW RADAR SIGNAL PROCESSING METHOD

BACKGROUND OF THE INVENTION

1. Field of the Invention

The present invention relates to a frequency modulated continuous wave (FMCW) radar device and an FMCW radar signal processing method for detecting an object serving as a target (hereinafter simply referred to as "target"), and measuring a distance to the target and a speed relative to the target.

2. Description of the Related Art

In recent years, an FMCW radar device (hereinafter also simply referred to as "FMCW radar") is used, which can deal with a target at a distance of several hundred meters with a less expensive and simpler configuration than a pulse radar and other radars. The FMCW radar radiates (transmits) a transmission signal subjected to specific modulation as an electromagnetic wave, receives the electromagnetic wave reflected by a target as a reception signal, and generates a beat signal based on the transmission signal and the reception signal.

Further, the beat signal is converted into digital data by an AD converter (analog-to-digital converter: ADC), and is then input to a central processing unit (CPU) or the like. The CPU performs signal processing, to thereby detect the target and measure a distance to the target and a speed relative to the target.

As such FMCW radar device, the following FMCW radar device is known. In order to detect a plurality of targets over a wide range and to measure a distance to each of the detected targets and a speed relative to each target, the FMCW radar device includes a plurality of band-pass filters (BPFs) having different pass bandwidths prepared for respective range observation periods corresponding to the ranges where the targets are detectable, and the BPFs are switched for each range observation period (see, for example, Japanese Patent Application Laid-open No. 2013-88273).

However, the related art has the following problem.

Specifically, the related-art FMCW radar device switches the BPFs by using switches for each range observation period in order to detect the plurality of targets over a wide range and to measure the distance to each of the detected targets and the speed relative to each target. Accordingly, the related-art FMCW radar device needs to include the plurality of BPFs and switches, resulting in a problem in that the device is expensive.

SUMMARY OF THE INVENTION

The present invention has been made in order to solve the problem described above, and it is an object thereof to provide an FMCW radar device and an FMCW radar signal processing method, which are capable of detecting a plurality of targets and measuring a distance to each of the detected targets and a speed relative to each target at low cost.

According to one embodiment of the present invention, there is provided an FMCW radar device configured to transmit a transmission signal as an electromagnetic wave, receive the electromagnetic wave reflected by a target as a reception signal, mix the transmission signal and the reception signal together to generate a beat signal, detect the target based on the beat signal, and measure a distance from the detected target and a speed relative to the detected target, the FMCW radar device including: a range observation period setting section configured to set a plurality of range observation periods, each of which corresponds to an observable range and includes an up-chirp period and a down-chirp period; a modulated frequency width setting section configured to set, for the respective plurality of range observation periods, a plurality of modulated frequency widths that are different from one another; a beat signal generation section configured to generate, for the respective plurality of range observation periods, beat signals based on the transmission signal and the reception signal; and a pass bandwidth setting section configured to set pass bandwidths of the beat signals generated by the beat signal generation section, in which the modulated frequency width setting section sets, for the respective plurality of range observation periods, the plurality of modulated frequency widths so that a difference among maximum frequencies of the beat signals generated for the respective plurality of range observation periods becomes zero or falls within a predetermined range.

According to one embodiment of the present invention, there is provided an FMCW radar signal processing method for transmitting a transmission signal as an electromagnetic wave, receiving the electromagnetic wave reflected by a target as a reception signal, mixing the transmission signal and the reception signal together to generate a beat signal, detecting the target based on the beat signal, and measuring a distance from the detected target and a speed relative to the detected target, the FMCW radar signal processing method including: setting a plurality of range observation periods, each of which corresponds to an observable range and includes an up-chirp period and a down-chirp period; and setting, for the respective plurality of range observation periods, a plurality of modulated frequency widths that are different from one another, in which the setting a plurality of modulated frequency widths includes setting, for the respective plurality of range observation periods, the plurality of modulated frequency widths so that a difference among maximum frequencies of the beat signals generated for the respective plurality of range observation periods becomes zero or falls within a predetermined range.

According to the FMCW radar device and the FMCW radar signal processing method of the one embodiment of the present invention, the modulated frequency width setting section (step) sets, for the respective plurality of range observation periods, the plurality of modulated frequency widths so that the difference among maximum frequencies of the beat signals generated for the respective plurality of range observation periods becomes zero or falls within the predetermined range.

Therefore, a plurality of targets may be detected and the distance to each of the detected targets and the speed relative to each target may be measured at low cost.

DETAILED DESCRIPTION OF THE PREFERRED EMBODIMENT

Figure 1:
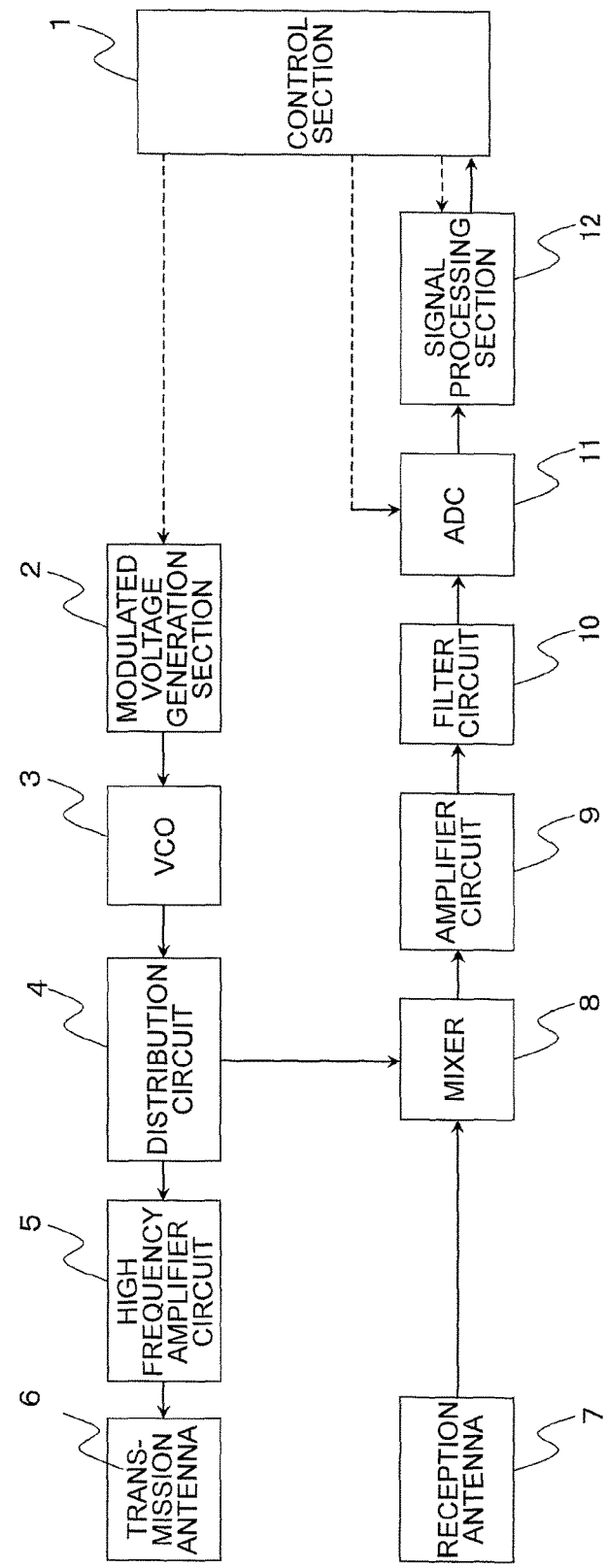
FIG. 1 is a block diagram illustrating an FMCW radar device according to a first embodiment of the present invention.

Now, an FMCW radar device and an FMCW radar signal processing method according to an exemplary embodiment of the present invention are described with reference to the accompanying drawings. In the drawings, the same or corresponding parts are denoted by the same reference symbols for description.

Note that, the following embodiment is described by way of example in which the FMCW radar device according to the present invention is mounted on a vehicle to perform processing of detecting a target. However, the present invention is not limited thereto, and the same effects may be obtained even when the FMCW radar device according to the present invention is applied to other moving bodies than the vehicle, such as a ship and an aircraft.

First Embodiment

FIG. 1 is a block diagram illustrating an FMCW radar device according to a first embodiment of the present invention.

In FIG. 1, the FMCW radar device includes a control section 1, a modulated voltage generation section (range observation period setting section, modulated frequency width setting section) 2, a voltage-controlled oscillator (hereinafter referred to as "VCO") 3, a distribution circuit 4, a high frequency amplifier circuit 5, a transmission antenna 6, a reception antenna 7, a mixer (beat signal generation section) 8, an amplifier circuit 9, a filter circuit (pass bandwidth setting section) 10, an ADC 11, and a signal processing section 12.

In this case, the control section 1, the modulated voltage generation section 2, and the signal processing section 12 are each formed of, for example, a dedicated logic circuit, a program in a general-purpose CPU or digital signal processor (DSP), or a combination thereof, and a data storage memory.

The control section 1 controls operation timings of the respective components of the FMCW radar device (for example, the modulated voltage generation section 2, the ADC 11, and the signal processing section 12).

Figure 2:
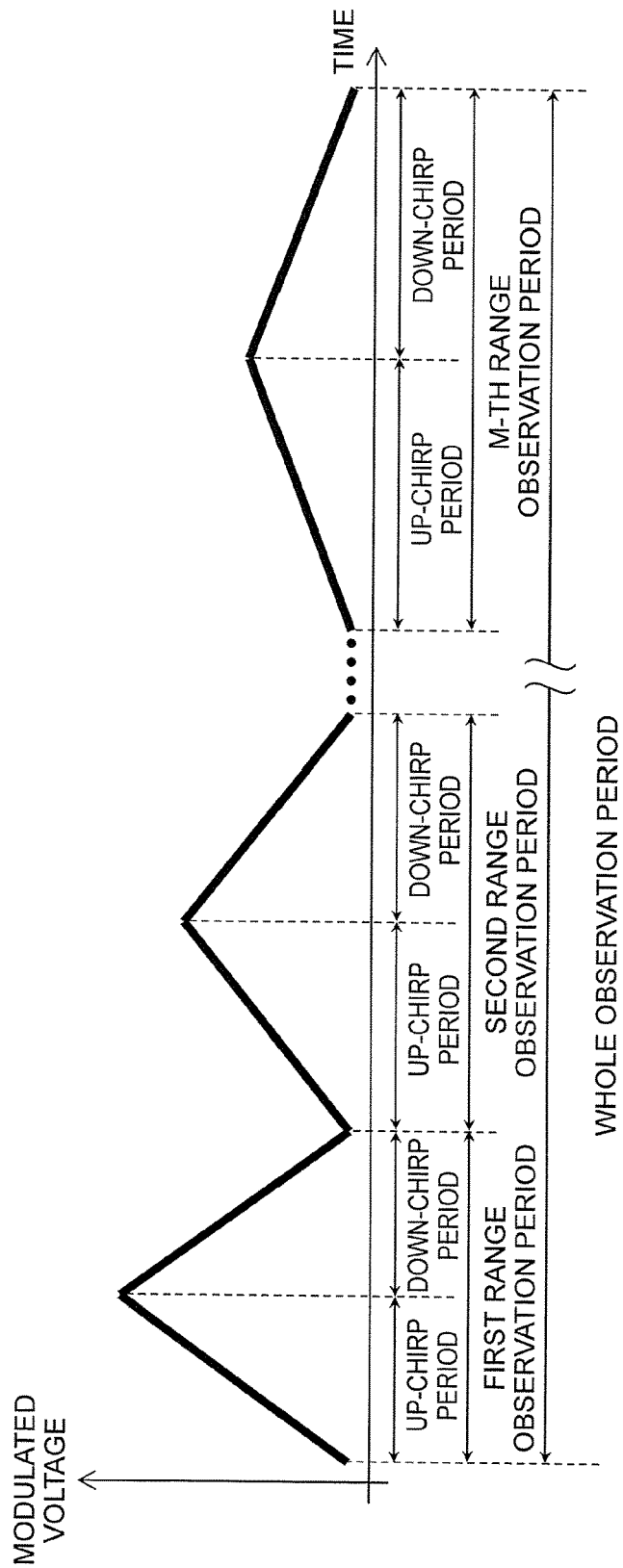
FIG. 2 is a graph showing a relationship between time and a modulated voltage in observation periods of the FMCW radar device according to the first embodiment of the present invention.

The modulated voltage generation section 2 is controlled by the control section 1 to generate an FMCW modulated voltage for each of a first range to an M-th (>1) range as shown in FIG. 2. FIG. 2 is a graph showing a relationship between time and the modulated voltage in observation periods of the FMCW radar device according to the first embodiment of the present invention.

In FIG. 2, the modulated voltage has periods for observing the first range to the M-th range (first range observation period to M-th range observation period) over the whole given observation period set in advance, and each of the range observation periods has an up-chirp period during which an applied voltage increases with time and a down-chirp period during which the applied voltage decreases with time.

Figure 3:
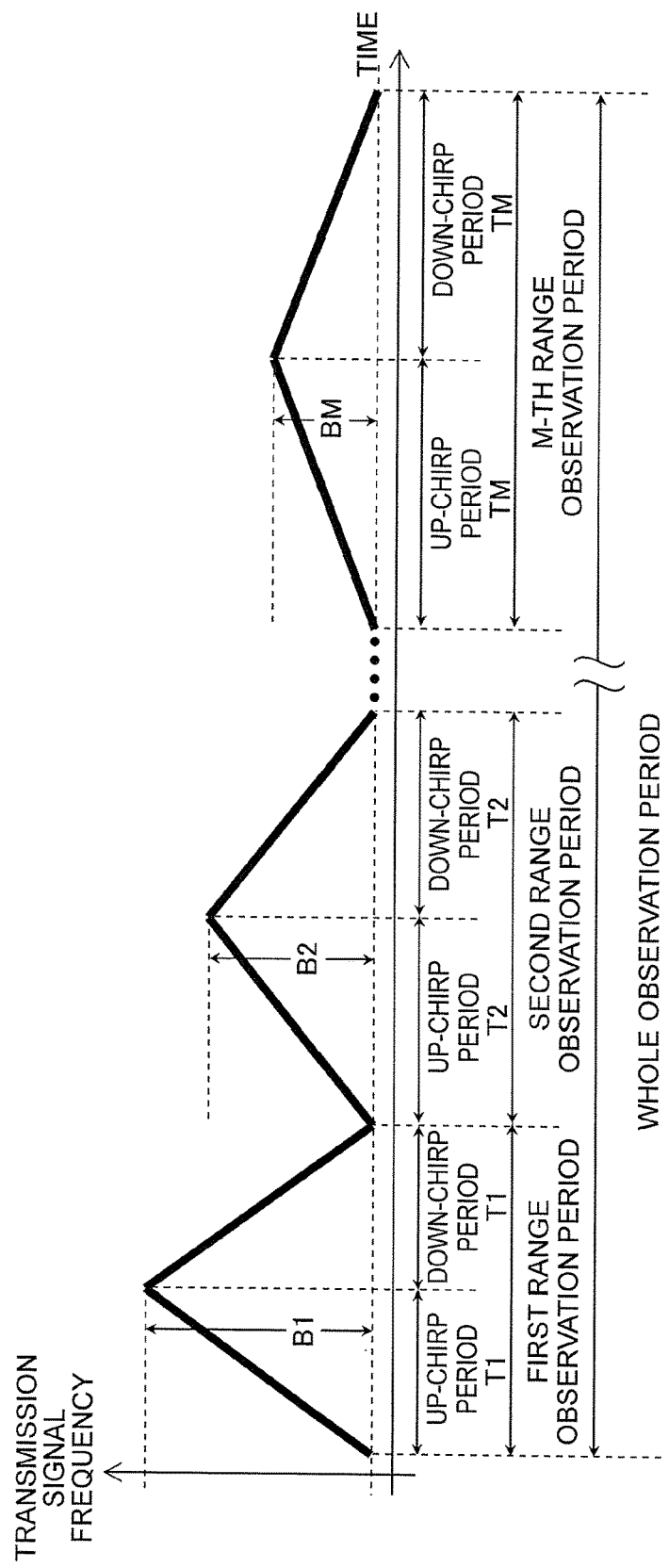
FIG. 3 is a graph showing a relationship between time and a transmission signal frequency in the observation periods of the FMCW radar device according to the first embodiment of the present invention.

The VCO 3 generates, depending on the modulated voltage applied from the modulated voltage generation section 2, for each range observation period, a transmission signal that changes in frequency with time as shown in FIG. 3. FIG. 3 is a graph showing a relationship between time and the transmission signal frequency in the observation periods of the FMCW radar device according to the first embodiment of the present invention.

In FIG. 3, similarly to the modulated voltage, the transmission signal has a first range observation period to an M-th range observation period over the whole given observation period set in advance, and each of the range observation periods has an up-chirp period (T1 to TM) during which the frequency of the transmission signal increases with time and a down-chirp period (T1 to TM) during which the frequency of the transmission signal decreases with time.

Note that, as described in Japanese Patent Application Laid-open No. 2013-88273, different modulated frequency widths (B1 to BM) may be set for the range observation periods each including the up-chirp period and the down-chirp period, thereby enabling a plurality of ranges in which the frequency is obtained by fast Fourier transform (FFT) to be set for the range observation periods.

In order to facilitate the description, the case where the modulated voltage generation section 2 sets two range observation periods (that is, the case of M=2) is described below as an example.

Figure 4:
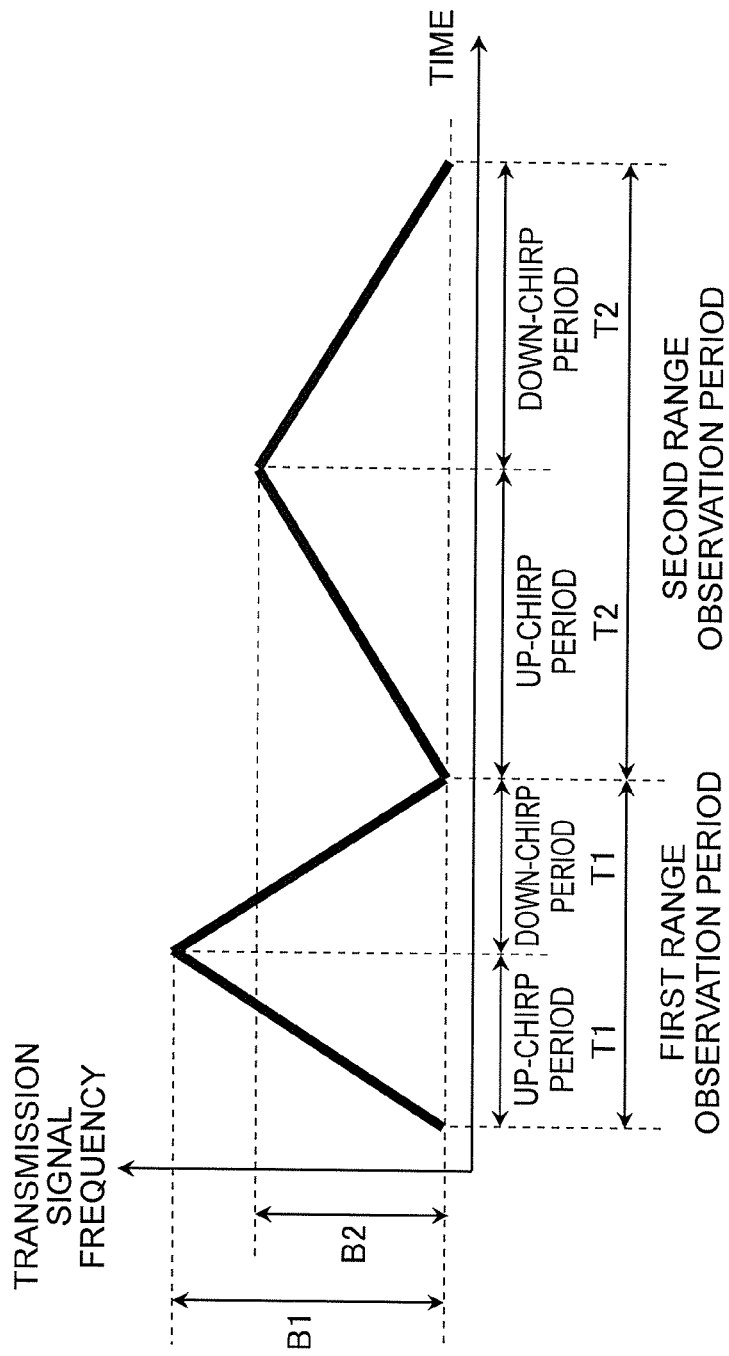
FIG. 4 is a graph showing a relationship between time and a transmission signal frequency in the observation periods of the FMCW radar device according to the first embodiment of the present invention.

When two range observation periods are provided, as shown in FIG. 4, the up-chirp period T1 in the first range observation period (having the modulated frequency width B1) and the down-chirp period T1 in the first range observation period, and the up-chirp period T2 in the second range observation period (having the modulated frequency width B2) and the down-chirp period T2 in the second range observation period are set.

In this case, the modulated voltage generation section 2 sets the modulated frequency width B1 in the first range observation period and the modulated frequency width B2 in the second range observation period so that the absolute value of the difference between maximum frequencies of beat signals generated for the respective range observation periods may become zero or fall within a predetermined range. A method of setting the modulated frequency width B1 and the modulated frequency width B2 by the modulated voltage generation section 2 is specifically described below.

First, the modulated voltage generation section 2 sets the modulated frequency width B1 [Hz] in the first range observation period based on hardware constraints of the VCO 3 and constraints of the Radio Act. A maximum frequency fb_max1 of a beat signal in the first range observation period is determined by the product of a minimum frequency bin bin_min1 and a maximum frequency bin bin_max1. The minimum frequency bin bin_min1 and the maximum frequency bin bin_max1 are set based on the principle of FMCW radar by Expressions (1) and (2).

$$\text{bin\_min1} = 1/T1 = fs/F1 \quad (1)$$

$$\text{bin\_max1} = R\max1/\Delta R1 + V\max1/\Delta V1 = (2 \times R\max1 \times B1 + 2 \times V\max1 \times fc \times T1)/C \quad (2)$$

Note that, in Expressions (1) and (2), T1[s] represents one chirp observation period in the first range observation period; fs [Hz], a sampling frequency; F1, the number of FFT points in the first range observation period; Rmax1[m], a maximum detection distance observed in the first range observation period; ΔR1 [m], a distance resolution in the first range observation period; Vmax1 [m/s], a maximum relative speed observed in the first range observation period; ΔV1 [m/s], a relative speed resolution in the first range observation period; fc [Hz], a center frequency of the modulated frequency width; and C [m/s], the speed of light.

Subsequently, the modulated voltage generation section 2 sets the modulated frequency width B2 in the second range observation period by Expression (3) so that an absolute value fb_max of the difference between the maximum frequency fb_max1 of the beat signal in the first range observation period and a maximum frequency fb_max2 of a beat signal in the second range observation period may become zero or fall within a predetermined range.

$$B2=((fb\_max-\alpha)\times T2\times C-2\times fc\times T2\times V\max 2)/(2\times R\max 2) \qquad (3)$$

Note that, in Expression (3), $\alpha$ represents zero or the predetermined range; T2[s], one chirp observation period in the second range observation period; Vmax2 [m/s], a maximum relative speed observed in the second range observation period; and Rmax2 [m], a maximum detection distance observed in the second range observation period.

In this case, the maximum frequency fb_max2 may be calculated by applying, to Expressions (1) and (2), the above-mentioned T2 [s], Vmax2 [m/s], and Rmax2 [m] and F2 representing the number of FFT points in the second range observation period, ΔR2 [m] representing a distance resolution in the second range observation period, and ΔV2 [m/s] representing a relative speed resolution in the second range observation period.

Returning to FIG. 1, the VCO 3 generates, depending on the modulated voltage applied from the modulated voltage generation section 2, for each range observation period, a transmission signal that changes in frequency with time as shown in FIG. 4, and outputs the generated transmission signal to the distribution circuit 4. The distribution circuit 4 outputs apart of the transmission signal generated by the VCO 3 to the high frequency amplifier circuit 5, and outputs the remaining of the transmission signal to the mixer 8.

The high frequency amplifier circuit 5 amplifies electric power of the transmission signal output from the distribution circuit 4 to the magnitude set in advance, and outputs the amplified electric power to the transmission antenna 6. The transmission antenna 6 radiates (transmits) the transmission signal amplified by the high frequency amplifier circuit 5 to the space as an electromagnetic wave. The transmitted electromagnetic wave irradiates a target (not shown), and then the reception antenna 7 receives the electromagnetic wave reflected by the target.

The reception antenna 7 receives the electromagnetic wave reflected by the target, and outputs the received electromagnetic wave to the mixer 8 as a reception signal. The mixer 8 mixes the transmission signal output from the distribution circuit 4 and the reception signal output from the reception antenna 7 together to generate a beat signal, and outputs the generated beat signal to the amplifier circuit 9. The amplifier circuit 9 amplifies a voltage of the beat signal output from the mixer 8 to the magnitude set in advance, and outputs the amplified voltage to the filter circuit 10.

The filter circuit 10 suppresses an unnecessary frequency component from the beat signal output from the amplifier circuit 9 (extracts a signal in a desired band), and outputs the resultant beat signal to the ADC 11. In this case, a maximum value of the pass bandwidth of the filter circuit 10 is the same as the maximum frequency of the beat signal in the first range observation period or the second range observation period. The ADC 11 converts a voltage value of the beat signal output from the filter circuit 10 into digital data, and outputs the converted digital data to the signal processing section 12.

The signal processing section 12 first performs FFT on the digital data of the beat signal of the up-chirp period and the down-chirp period in each of the first range observation period and the second range observation period, which has been output from the ADC 11, to thereby extract a beat frequency in each period.

In this case, the signal processing section 12 performs FFT to convert the beat signal, which has been converted into digital data by the ADC 11, into a frequency power spectrum, and extracts a frequency which is higher than a threshold set in advance and at which power is maximum. In this manner, the beat frequency is obtained to detect the presence or absence of a target.

Subsequently, the signal processing section 12 calculates a distance to the target and a speed relative to the target based on the known principle of FMCW radar from the beat frequency of the up-chirp period in the first range observation period, the beat frequency of the down-chirp period in the first range observation period, the beat frequency of the up-chirp period in the second range observation period, and the beat frequency of the down-chirp period in the second range observation period.

As described above, according to the first embodiment, the modulated frequency width setting section sets the modulated frequency widths for the respective range observation periods so that the difference among the maximum frequencies of the beat signals generated for the respective range observation periods may become zero or fall within a predetermined range.

With this, there is no need to switch a reception bandwidth, and the number of reception systems may be reduced to one, thus eliminating the need to provide a plurality of filters and switches.

Consequently, a plurality of targets may be detected and a distance to each of the detected targets and a speed relative to each target may be measured at low cost.

Note that, the first embodiment has been described above by way of example in which the number of range observation periods is two (M=2), but the same effects as those in the above-mentioned first embodiment may be obtained by the same method even when the number of range observation periods is three or more (M≥3).

What is claimed is:

1. A frequency modulated continuous wave (FMCW) radar device configured to transmit a transmission signal as an electromagnetic wave, receive the electromagnetic wave reflected by a target as a reception signal, mix the transmission signal and the reception signal together to generate a beat signal, detect the target based on the beat signal, and measure a distance from the detected target and a speed relative to the detected target, the FMCW radar device comprising:
 a range observation period setter configured to set a plurality of range observation periods, each of the plurality of range observation periods comprising an up-chirp period and a down-chirp period;
 a modulated frequency width setter configured to set, for the respective plurality of range observation periods, a plurality of modulated frequency widths that are different from one another;
 a beat signal generator configured to generate, for the respective plurality of range observation periods, beat signals based on the transmission signal and the reception signal; and
 a pass bandwidth setter configured to set pass bandwidths of the beat signals generated by the beat signal generator,
 wherein the modulated frequency width setter sets, for the respective plurality of range observation periods that gradually increase with time, the plurality of modulated frequency widths to reduce a difference among maximum frequencies of the beat signals generated for the respective plurality of range observation periods to substantially zero.

2. The FMCW radar device according to claim 1, wherein maximum values of the pass bandwidths of the pass bandwidth setter are equal to the maximum frequencies of the beat signals generated for the respective plurality of range observation periods.

3. A frequency modulated continuous wave (FMCW) radar signal processing method for transmitting a transmission signal as an electromagnetic wave, receiving the electromagnetic wave reflected by a target as a reception signal, mixing the transmission signal and the reception signal together to generate a beat signal, detecting the target based on the beat signal, and measuring a distance from the detected target and a speed relative to the detected target, the FMCW radar signal processing method comprising:

setting a plurality of range observation periods, each of which corresponds to an observable range and includes an up-chirp period and a down-chirp period; and setting, for the respective plurality of range observation periods, a plurality of modulated frequency widths that are different from one another, wherein the setting a plurality of modulated frequency widths comprises setting, for the respective plurality of range observation periods that gradually increase with time, the plurality of modulated frequency widths to reduce a difference among maximum frequencies of the beat signals generated for the respective plurality of range observation periods to substantially zero.

4. The FMCW radar device according to claim 1, wherein the plurality of range observation periods comprises a first range observation period, and a second range observation period that is subsequent to the first range observation period, and the modulated frequency width setter is configured to set a second modulated frequency width of the second range observation period based on an equation in which the second modulated frequency width is proportional an absolute value fb_max of the difference between a maximum frequency fb_max1 of a first beat signal in the first range observation period and a maximum frequency fb_max2 of a second beat signal in the second range observation period.

5. The FMCW radar signal processing method according to claim 3, wherein the plurality of range observation periods comprises a first range observation period, and a second range observation period that is subsequent to the first range observation period, and the setting the plurality of modulated frequency widths comprises setting a second modulated frequency width of the second range observation period based on an equation in which the second modulated frequency width is proportional an absolute value fb_max of the difference between a maximum frequency fb_max1 of a first beat signal in the first range observation period and a maximum frequency fb_max2 of a second beat signal in the second range observation period.

* * * * *